(12) United States Patent
Fung

(10) Patent No.: US 10,124,255 B2
(45) Date of Patent: *Nov. 13, 2018

(54) MULTIPLE ELECTRONIC CONTROL AND TRACKING DEVICES FOR MIXED-REALITY INTERACTION

(71) Applicant: Blue Goji LLC, Austin, TX (US)

(72) Inventor: Coleman Fung, Spicewood, TX (US)

(73) Assignee: BLUE GOJI LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,787

(22) Filed: Jun. 21, 2016

(65) Prior Publication Data

US 2016/0279514 A1    Sep. 29, 2016

Related U.S. Application Data

(63) Continuation-in-part of application No. 15/175,043, filed on Jun. 7, 2016, now Pat. No. 9,766,696, and a continuation-in-part of application No. 14/846,966, filed on Sep. 7, 2015, and a continuation-in-part of application No. 14/012,879, filed on Aug. 28, 2013.

(60) Provisional application No. 62/310,568, filed on Mar. 18, 2016, provisional application No. 61/696,068, filed on Aug. 31, 2012.

(51) Int. Cl.
| | | |
|---|---|---|
| G06F 3/00 | (2006.01) |
| A63F 13/31 | (2014.01) |
| A63F 13/211 | (2014.01) |
| A63F 13/26 | (2014.01) |
| A63F 13/816 | (2014.01) |

(52) U.S. Cl.
CPC ............ *A63F 13/31* (2014.09); *A63F 13/211* (2014.09); *A63F 13/26* (2014.09); *A63F 13/816* (2014.09)

(58) Field of Classification Search
CPC ........ A63F 13/211; A63F 13/26; A63F 13/31; A63F 13/816; G06F 13/00; G06F 13/42; G06F 13/40; G06F 13/14
See application file for complete search history.

(56) References Cited

U.S. PATENT DOCUMENTS

| | | | |
|---|---|---|---|
| 2,473,401 A | 6/1949 | Wild | |
| 4,410,852 A | 10/1983 | Guretzky | |
| 7,811,200 B2 * | 10/2010 | Chiang | A63F 13/245 463/1 |
| 8,740,705 B2 * | 6/2014 | Yamazaki | A63F 13/06 463/36 |
| 8,892,219 B2 | 11/2014 | Pryor | |
| 9,098,614 B1 | 8/2015 | Tuthill et al. | |
| 9,224,311 B2 | 12/2015 | Yeh et al. | |
| 2001/0003712 A1 | 6/2001 | Roelofs | |
| 2006/0003838 A1 | 1/2006 | Kobayashi et al. | |

(Continued)

*Primary Examiner* — Idriss N Alrobaye
*Assistant Examiner* — Richard B Franklin
(74) *Attorney, Agent, or Firm* — Galvin Patent Law LLC; Brian R. Galvin

(57) ABSTRACT

A system for using multiple electronic control and tracking devices for mixed-reality interaction, comprising an electronic control device that communicates with a plurality of electronic devices via a network, that receives user interaction and conveys it to devices via the network, and that receives interaction from other devices via the network and conveys it to a host device, and a method for nested communication between multiple electronic control devices and electronic systems.

6 Claims, 16 Drawing Sheets

(56) References Cited

U.S. PATENT DOCUMENTS

| | | | |
|---|---|---|---|
| 2006/0063645 A1 | 3/2006 | Chiang | |
| 2009/0256800 A1 | 10/2009 | Kaufman | |
| 2010/0009752 A1* | 1/2010 | Rubin | A63F 13/06 463/36 |
| 2013/0171596 A1* | 7/2013 | French | G09B 19/00 434/236 |
| 2014/0066201 A1 | 3/2014 | Huang et al. | |
| 2014/0248996 A1* | 9/2014 | Adel | A63B 24/0062 482/8 |
| 2014/0365593 A1 | 12/2014 | Sun | |
| 2015/0074047 A1 | 3/2015 | Gardes et al. | |

\* cited by examiner

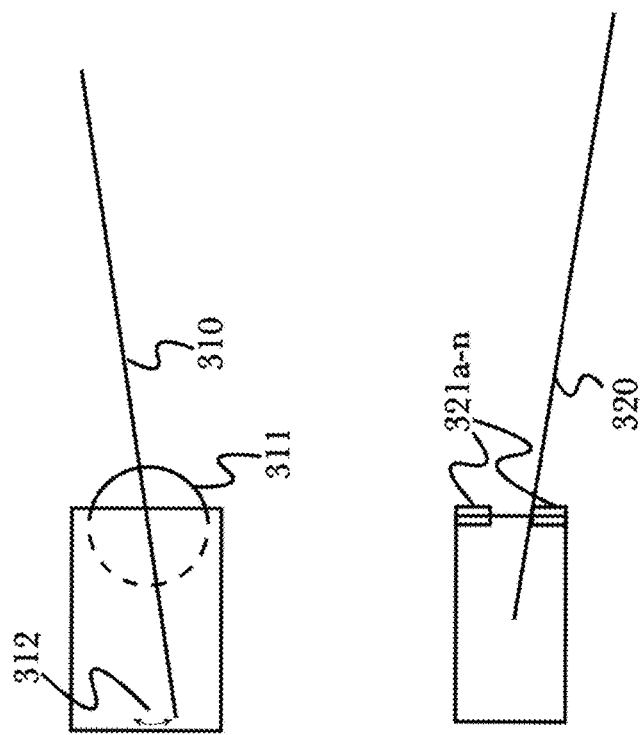

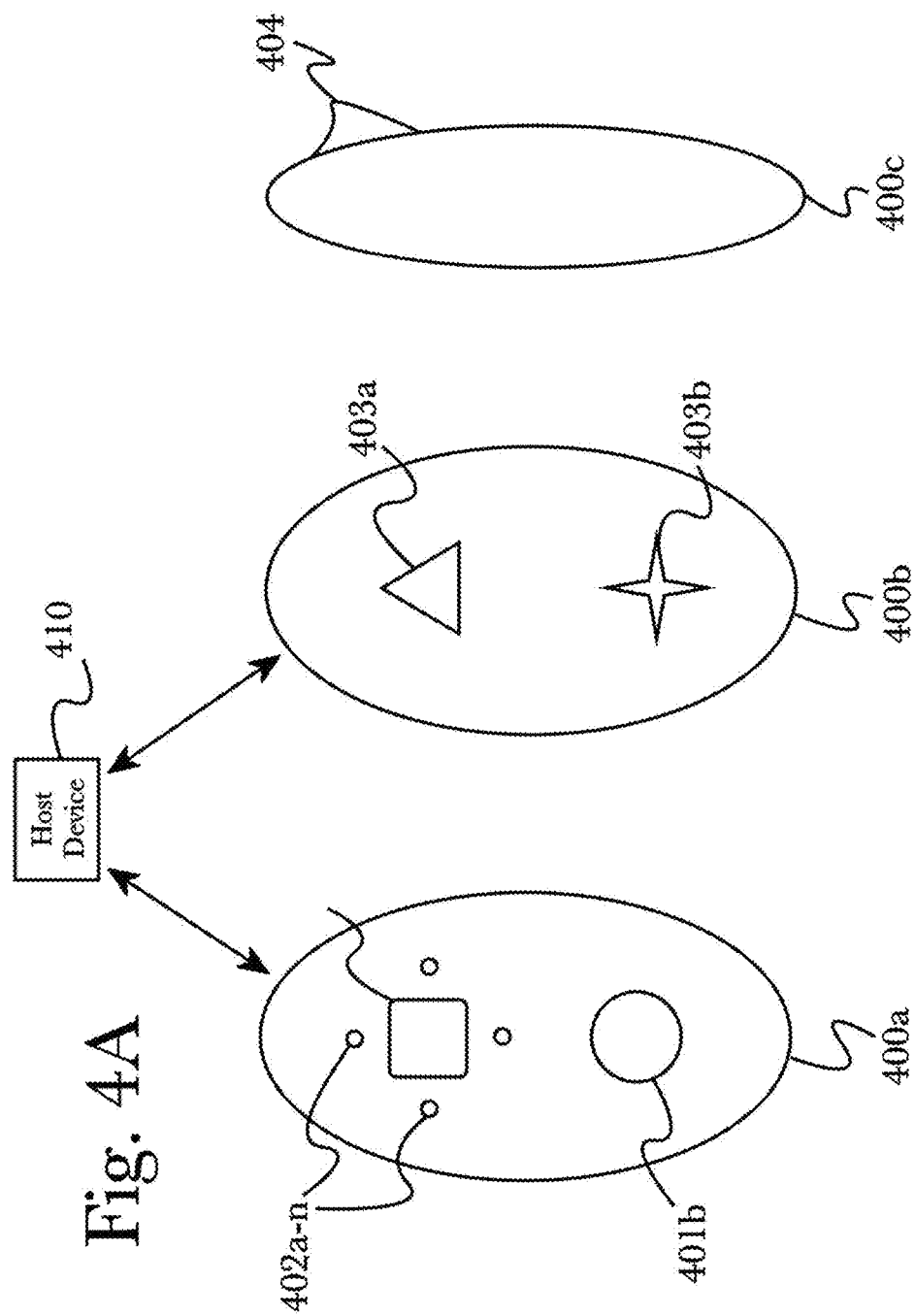

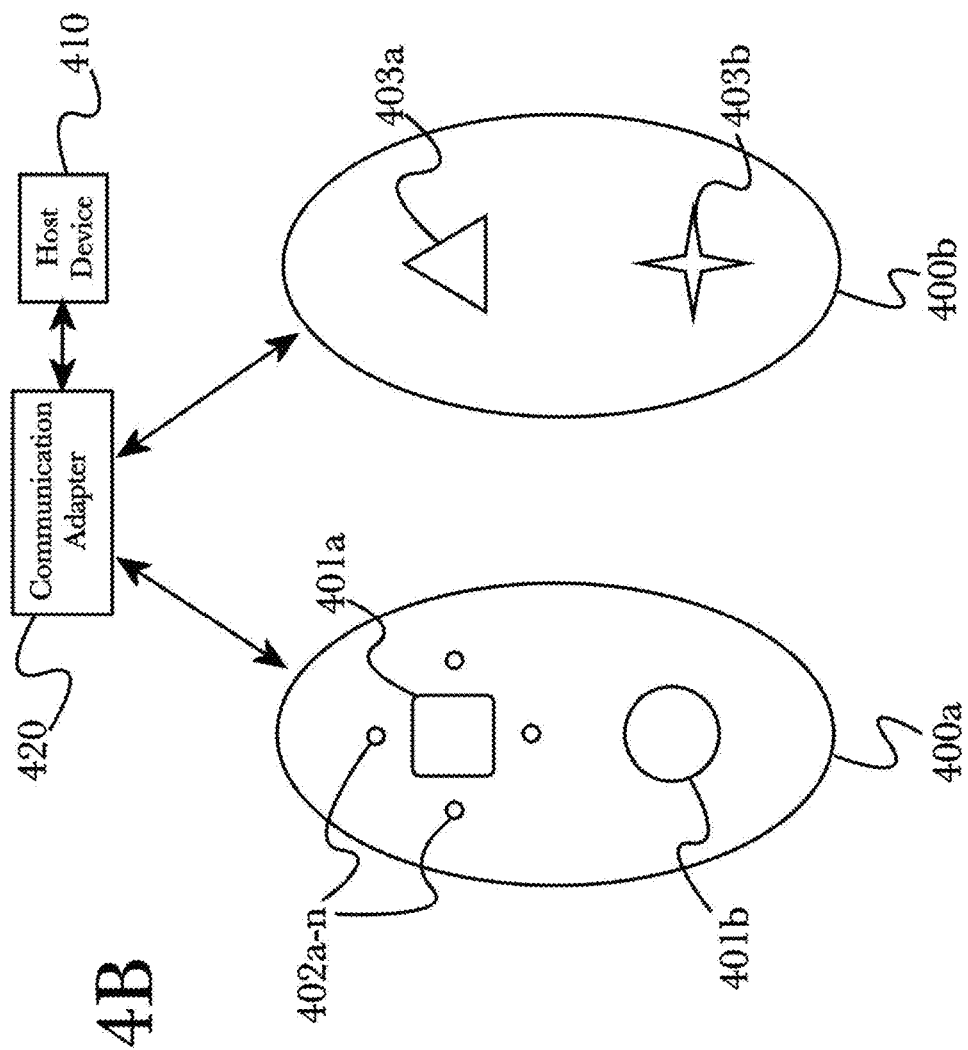

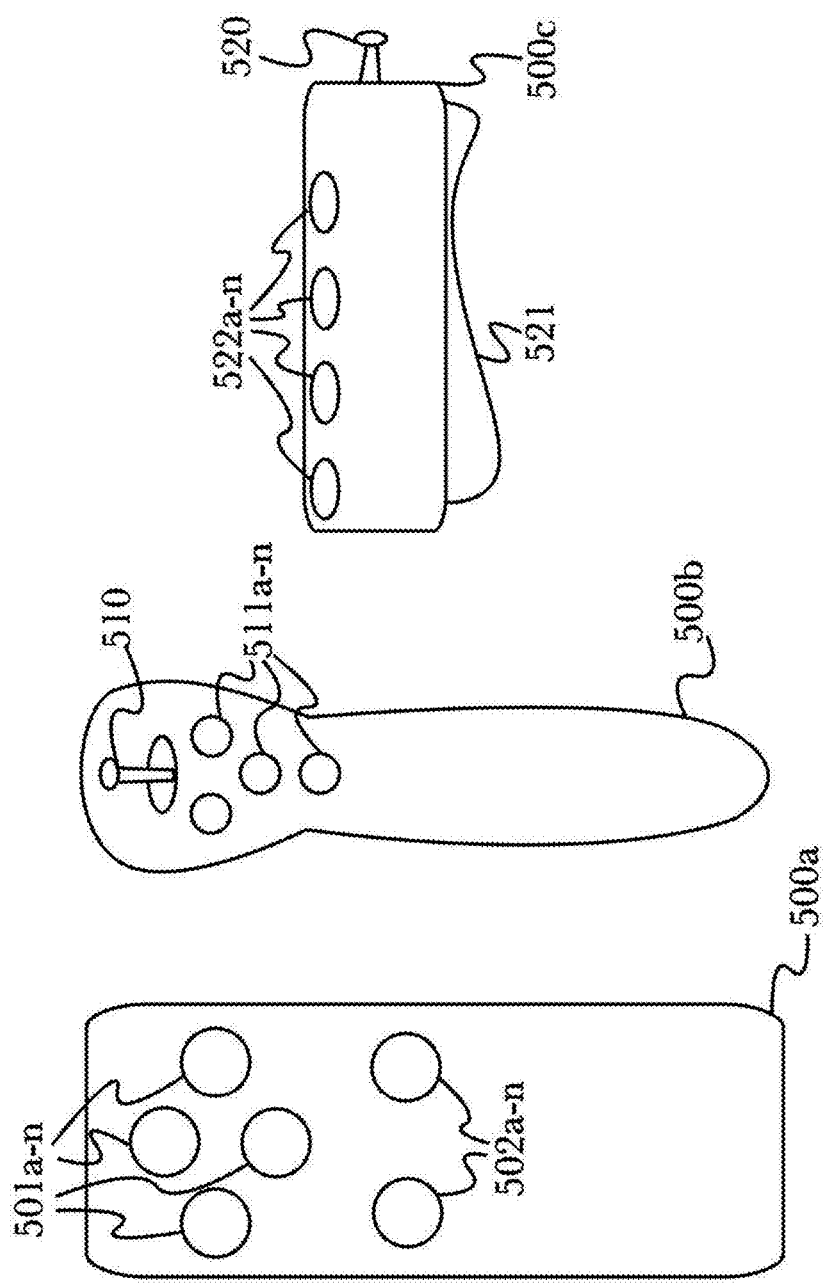

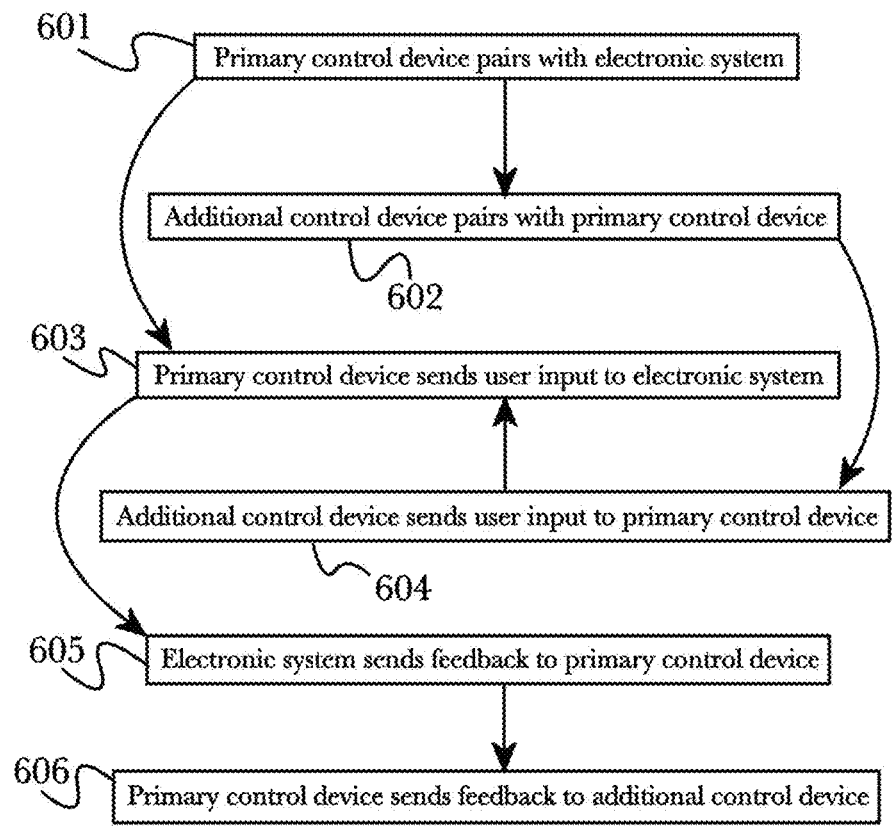
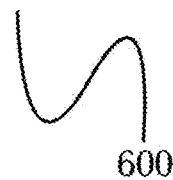
Fig. 6

MULTIPLE ELECTRONIC CONTROL AND TRACKING DEVICES FOR MIXED-REALITY INTERACTION

CROSS-REFERENCE TO RELATED APPLICATIONS

This application is a continuation-in-part of U.S. patent application Ser. No. 15/175,043, titled "APPARATUS FOR NATURAL TORSO TRACKING AND FEEDBACK FOR ELECTRONIC INTERACTION" and filed on Jun. 7, 2016, which claims the benefit of, and priority to, U.S. provisional patent application Ser. No. 62/310,568, titled "APPARATUS FOR NATURAL TORSO TRACKING AND FEEDBACK FOR ELECTRONIC INTERACTION" and filed on Mar. 18, 2016, and is also a continuation-in-part of U.S. patent application Ser. No. 14/846,966, titled "MULTIPLE ELECTRONIC CONTROL DEVICES" and filed on Sep. 7, 2015, and is also a continuation-in-part of United States patent application serial number, and is also a continuation-in-part of U.S. patent application Ser. No. 14/012,879, titled "Mobile and Adaptable Fitness System" and filed on Aug. 28, 2013, which claims the benefit of, and priority to, U.S. provisional patent application Ser. No. 61/696,068, titled "Mobile and Adaptable Fitness System" and filed on Aug. 31, 2012, the entire specification of each of which is incorporated herein by reference in its entirety.

BACKGROUND OF THE INVENTION

Field of the Art

The disclosure relates to the field of electronic devices, and more particularly to the field of input and output methods for interaction within software applications.

Discussion of the State of the Art

In the field of electronic devices, separate handheld controllers are commonly used to enable a user to provide interaction or receive feedback from a host device, such as a personal computer or a video gaming console. These controllers may be connected via a wired or a wireless connection, and generally are paired with only a single host device at any given time. When a user wishes to utilize multiple controllers, they must be connected individually to the host device (for example, connecting both a keyboard and a mouse to a personal computer, using two separate ports on the computer). This requires a number of separate communication connections between a host device and controllers, and if a host device or controller have mismatched communication hardware, they are incompatible and cannot be used. Additionally, controllers generally are designed for a particular purpose (such as for a particular type of video game or computer application), and require a user to interact with them in a specific fashion, such as to hold the controller in a particular manner to have manual access to all of its functions. This can be awkward or even unhealthy for the user, and restrictive of the manner with which they interact with the device.

Additionally, users typically interact with a fitness device, whether viewing or not viewing a static screen. For example, while running on a treadmill a user may choose to view a static screen displaying a television show. The elements in a television show are static, in that the elements do not change behavior based on the user's interactions with the television show, but instead perform predetermined actions. An example of a dynamic screen is that of a video game. The user interacts with a remote and influences the activity of the elements in the video game. At most, the user may interact with the screen performing an activity independent of actions related to interacting with the fitness device.

Furthermore, with the rapidly-expanding virtual reality industry, new interaction methods are being explored including a variety of controllers for gaming, wands, and motion-based input devices including gloves and camera-based hand tracking. However, these devices all focus on interacting with a user's hands, and ignore other parts of the body that could be used to improve interaction and immersion, while also expanding the possibilities for data collection.

What is needed, is a means to enable users to connect a variety of control and tracking devices to a host device regardless of their communication means, that also addresses the need for controllers that a user may interact with regardless of their position or movement, for interaction with mixed-reality electronic applications.

SUMMARY OF THE INVENTION

Accordingly, the inventor has conceived and reduced to practice, in a preferred embodiment of the invention, multiple electronic control and tracking devices for mixed-reality interaction that may be paired with a plurality of host devices and may communicate used nested communication.

According to a preferred embodiment of the invention, a system for using multiple electronic control and tracking devices for mixed-reality interaction, comprising an electronic control device comprising at least a plurality of programming instructions stored in a memory and operating on a processor of a network-connected computing device and configured to communicate with a plurality of electronic devices via a network, and configured to operate a plurality of hardware control elements, the hardware control elements configured to receive manual interaction from a user, and configured to transmit a plurality of interaction data to at least a portion of the plurality of electronic devices, the interaction data being based at least in part on at least a portion of the manual interaction from a human user, and configured to receive communication from at least a portion of the plurality of electronic devices, the communication comprising at least mixed-reality data, wherein the mixed-reality data comprises at least a plurality of sensor data readings, and configured to convey at least a portion of the communication to at least a portion of the plurality of electronic devices, is disclosed.

According to another preferred embodiment of the invention, a method for nested communication between multiple electronic control devices and electronic systems, comprising the steps of connecting, via a first electronic control device comprising at least a plurality of programming instructions stored in a memory and operating on a processor of a network-connected computing device and configured to communicate with a plurality of electronic devices via a network, and configured to operate a plurality of hardware control elements, the hardware control elements configured to receive a plurality of manual interaction from a human user, and configured to transmit a plurality of interaction information to at least a portion of the plurality of electronic devices, the interaction information being based at least in part on at least a portion of the plurality of manual interaction from a human user, and configured to receive communication from at least a portion of the plurality of electronic devices and convey at least a portion of the communication to at least a portion of the plurality of communication devices, to a host electronic device via a network; connecting, using an additional electronic control device comprising at least a plurality of programming instructions stored in a memory and operating on a processor of a network-connected computing device and configured to communicate with a plurality of electronic devices via a network, and configured to operate a plurality of hardware control elements, the hardware control elements configured to receive a plurality of manual interaction from a human user, and configured to transmit a plurality of interaction information to at least a portion of the plurality of electronic devices, the interaction information being based at least in part on at least a portion of the plurality of manual interaction from a human user, and configured to receive communication from at least a portion of the plurality of electronic devices and convey at least a portion of the communication to at least a portion of the plurality of communication devices, to the first electronic control device; receiving a plurality of user interaction at an additional electronic control device; transmitting a plurality of interaction information to the first electronic control device, the interaction information being based at least in part on at least a portion of the user interaction; and conveying, at the first electronic control device, at least a portion of the interaction information to the host electronic device, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 3 is a diagram of an additional exemplary hardware arrangement of an apparatus for natural torso tracking and feedback for electronic interaction according to a preferred embodiment of the invention, illustrating the use of angle sensors to detect angled movement of tethers.

FIG. 4A is a diagram illustrating an exemplary physical arrangement of paired, nested-communication wireless control devices, according to a preferred embodiment of the invention.

FIG. 4B is a diagram illustrating an exemplary physical arrangement of paired, nested-communication wireless control devices, illustrating communication via an adapter according to a preferred embodiment of the invention.

FIG. 5 is a diagram illustrating a variety of exemplary physical configurations of nested-communication wireless controllers, configured for various uses.

FIG. 6 is a flow diagram illustrating an exemplary method for nested communication between control devices and electronic systems, according to a preferred embodiment of the invention.

DETAILED DESCRIPTION

Figure 1:
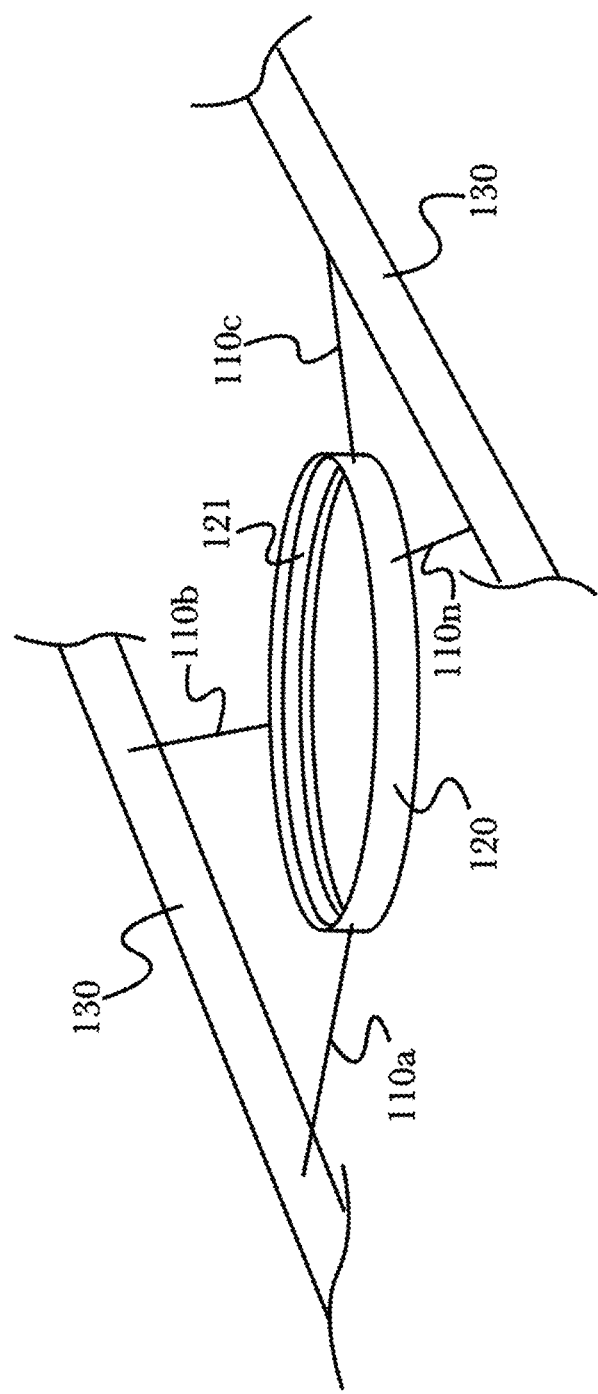
FIG. 1 is a diagram of an exemplary hardware arrangement of an apparatus for natural torso tracking and feedback for electronic interaction according to a preferred embodiment of the invention, illustrating the use of multiple tethers and a movable torso harness.

The inventor has conceived, and reduced to practice, in a preferred embodiment of the invention, multiple electronic control and tracking devices for mixed-reality interaction that may be paired with a plurality of host devices and may communicate used nested communication.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

Figure 7:
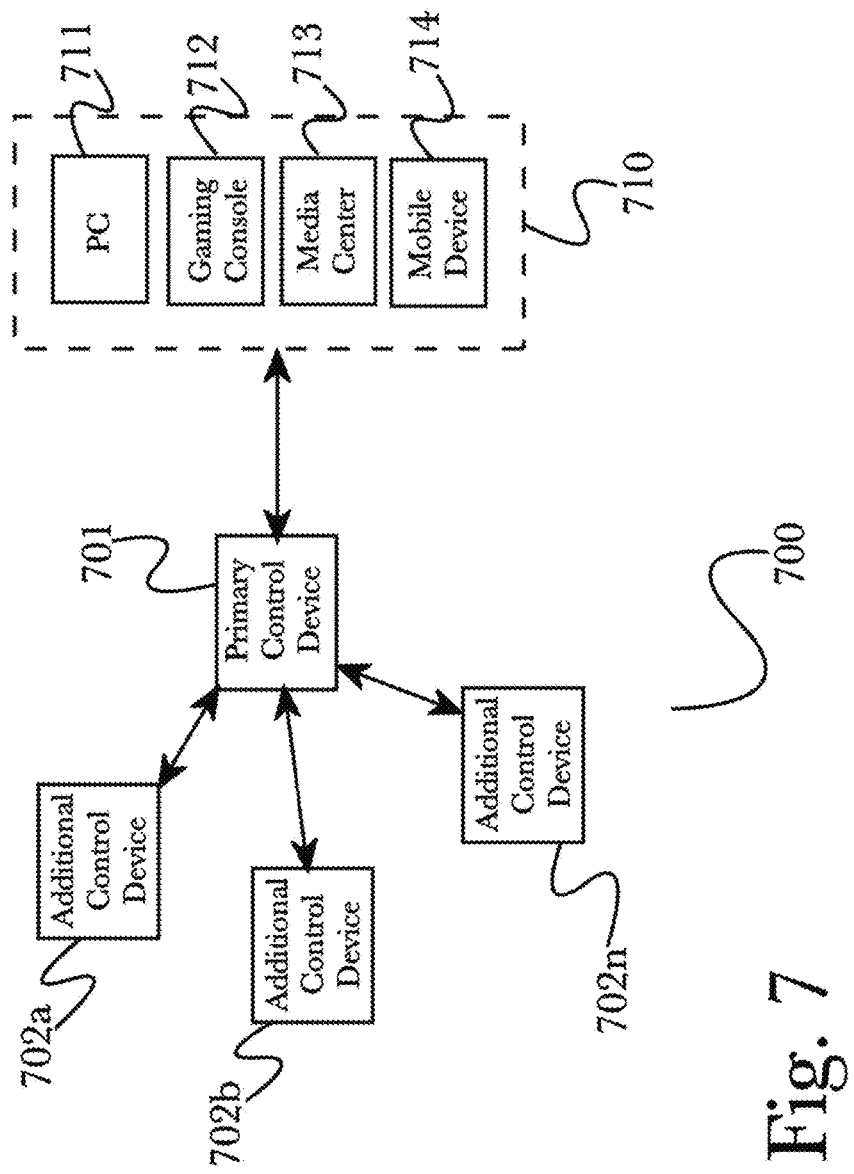
FIG. 7 is a block diagram of an exemplary system architecture, illustrating the use of nested-communication control devices with a variety of electronic systems, according to a preferred embodiment of the invention.

FIG. 7 is a block diagram of an exemplary system architecture 700, illustrating the use of nested-communication control devices 701, 702a-n with a variety of electronic systems 710, according to a preferred embodiment of the invention. According to the embodiment, a control device 701 may be connected to a plurality of electronic systems 710 such as including (but not limited to) a personal computer 711, video gaming console 712, media center (for example, a home theater system) 713, or mobile device 714 (for example, a smartphone or tablet computing device). Connection may occur via a variety of means, but according to the embodiment and as envisioned by the inventors, an ideal method of connection is via wireless connectivity means over the air. Exemplary communication protocols or technologies for such connectivity may include (but are not limited to) cellular radio communication, BLUETOOTH™, ANT™, WiFi, near-field communication (NFC), or other connectivity means.

According to the embodiment, a plurality of additional control devices 702a-n may be paired with a primary control device 701 via a variety of connectivity means. When connected in this manner, input from a user interacting via an additional control device 702a-n may be transmitted to primary control device 701, which may then convey the interaction to a plurality of connected electronic systems 710. Feedback, if provided by an electronic system 710, may then be received by primary control device 701 and conveyed to additional control devices 102a-n as needed (for example, if a user interacts via a particular additional control device 102a, and an electronic system 110 provides feedback intended specifically for that user or that device). It should be appreciated that not all control devices need to utilize similar connectivity means. For example, if a primary control device 101 is operating both a BLUETOOTH™ and a WiFi radio for wireless communication, an additional control device 102a may connect via BLUETOOTH™ while a second additional control device 102b may connect using WiFi. In this manner, a primary control device 101 may be considered a means to unify various connectivity means to facilitate communication between a plurality of electronic systems 110 and a plurality of additional control devices 102a-n of varying design and operation.

DETAILED DESCRIPTION OF EXEMPLARY EMBODIMENTS

FIG. 1 is a diagram of an exemplary hardware arrangement 100 for natural torso tracking and feedback for electronic interaction according to a preferred embodiment of the invention, illustrating the use of multiple tethers 110a-n and a movable torso harness 120. According to the embodiment, a plurality of tethers 110a-n may be affixed or integrally-formed as part of a handle or railing 130, such as handlebars found on exercise equipment such as a treadmill, elliptical trainer, stair-climbing machine, or the like. In alternate arrangements, specifically-designed equipment with integral tethers 110a-n may be used, but it may be appreciated that a modular design with tethers 110a-n that may be affixed and removed freely may be desirable for facilitating use with a variety of fitness equipment or structural elements of a building, according to a user's particular use case or circumstance. Tethers 110a-n may then be affixed or integrally-formed to a torso harness 120, as illustrated in the form of a belt, that may be worn by a user such that movement of their body affects tethers 110a-n and applies stress to them in a variety of manners. It should be appreciated that while a belt design for a torso harness 120 is shown for clarity, a variety of physical arrangements may be used such as including (but not limited to) a vest, a series of harness-like straps similar to climbing or rappelling equipment, a backpack, straps designed to be worn on a user's body underneath or in place of clothing (for example, for use in medical settings for collecting precise data) or a plurality of specially-formed clips or attachment points that may be readily affixed to a user's clothing. Additionally, a torso harness 120 may be constructed with movable parts, for example having an inner belt 121 that permits a user some degree of motion within the harness 120 without restricting their movement. Movement of inner belt 121 (or other movable portions) may be measured in a variety of ways, such as using accelerometers, gyroscopes, or optical sensors, and this data may be used as interaction with software applications in addition to data collected from tethers 110a-n as described below.

As a user moves, their body naturally shifts position and orientation. These shifts may be detected and measured via tethers 110a-n, for example by detecting patterns of tension or strain on tethers 110a-n to indicate body orientation, or by measuring small changes in strain on tethers 110a-n to determine more precise movements such as body posture while a user is speaking, or specific characteristics of a user's stride or gait. Additionally, through varying the quantity and arrangement of tethers 110a-n, more precise or specialized forms of movement may be detected and measured (such as, for example, using a specific arrangement of multiple tethers connected to a particular area of a user's body to detect extremely small movements for medical diagnosis or fitness coaching). This data may be used as interaction with software applications, such as for virtual reality applications as input for a user to control a character in a game. In such an arrangement, when a user moves, this movement may be translated to an in-game character or avatar to convey a more natural sense of interaction and presence. For example, in a multiplayer role playing game, this may be used to facilitate nonverbal communication and recognition between players, as their distinct mannerisms and gestures may be conveyed in the game through detection of natural torso position and movement. In fitness or health applications, this data may be used to track and monitor a user's posture or ergonomic qualities, or to assist in coaching them for specific fitness activities such as holding a pose for yoga, stretching, or proper running form during use with a treadmill. In medical applications, this data may be used to assist in diagnosing injuries or deficiencies that may require attention, such as by detecting anomalies in movement or physiological adaptations to an unrecognized injury (such as when a user subconsciously shifts their weight off an injured foot or knee, without consciously realizing an issue is present).

Through various arrangements of tethers 110a-n and tether sensors (as described below, referring to FIGS. 2-3), it may be possible to enable a variety of immersive ways for a user to interact with software applications, as well as to receive haptic feedback from applications. For example, by detecting rotation, tension, stress, or angle of tethers a user may interact with applications such as virtual reality games or simulations, by using natural body movements and positioning such as leaning, jumping, crouching, kneeling, turning, or shifting their weight in various directions to trigger actions within a software application configured to accept torso tracking input. By applying haptic feedback of varying form and intensity (as is described in greater detail below, referring to FIG. 2), applications may provide physical indication to a user of software events, such as applying tension to resist movement, pulling or tugging on a tether to move or "jerk" a user in a direction, or varying feedback to multiple tethers such as tugging and releasing in varying order or sequence to simulate more complex effects such as (for example, in a gaming use case) explosions, riding in a vehicle, or walking through foliage.

It should be appreciated that while reference is made to virtual reality applications, a wide variety of use cases may be possible according to the embodiment. For example, torso tracking may be used for fitness and health applications, to monitor a user's posture or gait while walking, without the use of additional virtual reality equipment or software.

Figure 2:
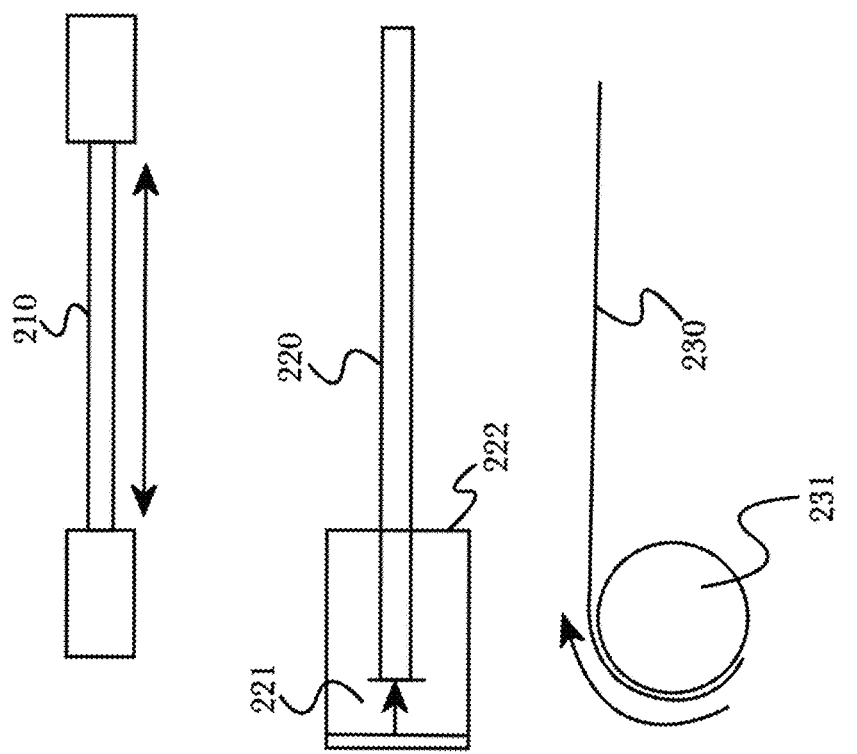
FIG. 2 is a diagram illustrating a variety of alternate tether arrangements.

FIG. 2 is a diagram illustrating a variety of alternate tether arrangements. According to various use cases and hardware arrangements, tethers 110a-n may utilize a variety of purpose-driven designs as illustrated. For example, a "stretchable" tether 210 may be used to measure strain during a user's movement, as the tether 210 is stretched or compressed (for example, using piezoelectric materials and measuring electrical changes). Such an arrangement may be suitable for precise measurements, but may lack the mechanical strength or durability for gross movement detection or prolonged use. An alternate construction may utilize a non-deforming tether 220 such as a steel cable or similar non-stretching material. Instead of measuring strain on the tether 220, instead tether 220 may be permitted a degree of movement within an enclosure 222 (for example, an attachment point on a torso harness 120 or handlebar 130), and the position or movement 221 of the tether 220 may be measured such as via optical sensors. In a third exemplary arrangement, a tether 230 may be wound about an axle or pulley 231, and may be let out when force is applied during a user's movement. Rotation of the pulley 231 may be measured, or alternately a tension device such as a coil spring may be utilized (not shown) and the tension or strain on that device may be measured as tether 230 is extended or retracted. In this manner, it may be appreciated that a variety of mechanical means may be used to facilitate tethers and attachments for use in detecting and measuring natural torso position and movement, and it should be appreciated that a variety of additional or alternate hardware arrangements may be utilized according to the embodiments disclosed herein.

Additionally, through the use of various hardware construction it becomes possible to utilize both "passive" tethers that merely measure movement or strain, as well as "active" tethers that may apply resistance or movement to provide haptic feedback to a user. For example, in an arrangement utilizing a coiled spring or pulley 231, the spring or pulley 231 may be wound to retract a tether and direct or impede a user's movement as desired. In this manner, various new forms of feedback-based interaction become possible, and in virtual reality use cases user engagement and immersion are increased through more natural physical feedback during their interaction.

By applying various forms and intensities of feedback using various tether arrangements, a variety of feedback types may be used to provide haptic output to a user in response to software events. For example, tension on a tether may be used to simulate restrained movement such as wading through water or dense foliage, walking up an inclined surface, magnetic or gravitational forces, or other forms of physical resistance or impedance that may be simulated through directional or non-directional tension. Tugging, retracting, or pulling on a tether may be used to simulate sudden forces such as recoil from gunfire, explosions, being grabbed or struck by a software entity such as an object or character, deploying a parachute, bungee jumping, sliding or falling, or other momentary forces or events that may be conveyed with a tugging or pulling sensation. By utilizing various patterns of haptic feedback, more complex events may be communicated to a user, such as riding on horseback or in a vehicle, standing on the deck of a ship at sea, turbulence in an aircraft, weather, or other virtual events that may be represented using haptic feedback. In this manner, virtual environments and events may be made more immersive and tangible for a user, both by enabling a user to interact using natural body movements and positioning, as well as by providing haptic feedback in a manner that feels natural and expected to the user. For example, if a user is controlling a character in a gaming application through a first-person viewpoint, it would seem natural that when their character is struck there would be a physical sensation corresponding to the event; however, this is not possible with traditional interaction devices, detracting from any sense of immersion or realism for the user. By providing this physical sensation alongside the virtual event, the experience becomes more engaging and users are encouraged to interact more naturally as their actions results in natural and believable feedback, meeting their subconscious expectations and avoiding excessive "immersion-breaking" moments, which in turn reduces the likelihood of users adopting unusual behaviors or unhealthy posture as a result of adapting to limited interaction schema.

Haptic feedback may be provided to notify a user of non-gaming events, such as for desktop notifications for email or application updates, or to provide feedback on their posture for use in fitness or health coaching. For example, a user may be encouraged to maintain a particular stance, pose, or posture while working or for a set length of time (for example, for a yoga exercise application), and if their posture deviates from an acceptable range, feedback is provided to remind them to adjust their posture. This may be used in sports, fitness, health, or ergonomic applications that need not utilize other aspects of virtual reality and may operate as traditional software applications on nonspecialized computing hardware. For example, a user at their desk may use an ergonomic training application that monitors their body posture throughout the work day and provides haptic reminders to correct poor posture as it is detected, helping the user to maintain a healthy working posture to reduce fatigue or injuries due to poor posture (for example, repetitive-stress injuries that may be linked to poor posture while working at a computer).

FIG. 3 is a diagram of an additional exemplary hardware arrangement 300 for natural torso tracking and feedback for electronic interaction according to a preferred embodiment of the invention, illustrating the use of angle sensors 312, 321a-n to detect angled movement of a tether 320. According to one exemplary arrangement, a tether 310 may be affixed to or passed through a rotating joint such as a ball bearing 311 or similar, to permit free angular movement. During movement, the angular movement or deflection 312 of a protruding bar, rod, or tether segment 313 may be measured (for example, using optical, magnetic, or other sensors) to determine the corresponding angle of tether 310. In this manner, precise angle measurements may be collected without impeding range of motion or introducing unnecessary mechanical complexity.

In an alternate hardware arrangement, the use of angle sensors 321a-n enables tracking of a vertical angle of a tether 320, to detect and optionally measure vertical movement or orientation of a user's torso. When tether 320 contacts a sensor 321a-n, this may be registered and used to detect a general vertical movement (that is, whether the tether is angled up or down). For more precise measurements, the specific hardware construction of a sensor 321a-n may be varied, for example using a pressure-sensing switch to detect how much force is applied and use this measurement to determine the corresponding angle (as may be possible given a tether 320 of known construction). It should be appreciated that various combinations of hardware may be used to provide a desired method or degree of angle detection or measurement, for example using a conductive tether 320 and a capacitive sensor 321a-n to detect contact, or using a mechanical or rubber-dome switch (as are commonly used in keyboard construction) to detect physical contact without a conductive tether 320.

The use of angle detection or measurement may expand interaction possibilities to encompass more detailed and natural movements of a user's body. For example, if a user crouches, then all tethers 110a-n may detect a downward angle simultaneously. Additionally, data precision or availability may be enhanced by combining input from multiple available sensors when possible (for example, utilizing adaptive software to collect data from any sensors that it detects, without requiring specific sensor types for operation), for example by combining data from tethers 110a-n and hardware sensors such as an accelerometer or gyroscope, enabling multiple methods of achieving similar or varied types or precision levels of position or movement detection. Similarly, when a user jumps then all tethers may detect an upward angle simultaneously. However, if a user leans in one direction, it may be appreciated that not all tethers 110a-n will detect the same angle. For example, tethers 110a-n in the direction the user is leaning may detect a downward angle, while those on the opposite side would detect an upward angle (due to the orientation of the user's torso and thus a worn torso harness 120). In this manner, more precise torso interaction may be facilitated through improved detection and recognition of orientation and movement. Additionally, it may be appreciated that sensors 321a-n may be utilized for other angle measurements, such as to detect horizontal angle. For example, if a user is wearing a non-rotating torso harness 120, when they twist their body a similar stress may be applied to all attached tethers 110a-n. Without angle detection the precise nature of this movement will be vague, but with horizontal angle detection it becomes possible to recognize that all tethers 110a-n are being strained in a similar direction (for example, in a clockwise pattern when viewed from above, as a user might view tethers 110a-n during use), and therefore interpret the interaction as a twisting motion (rather than, for example, a user squatting or kneeling, which might apply a similar stress to the tethers 110a-n but would have different angle measurements).

FIG. 4A is a diagram illustrating an exemplary physical arrangement of paired, nested-communication wireless control devices 400a-b, according to a preferred embodiment of the invention. According to the embodiment, a plurality of wireless control devices 400a-b may be "paired" to a plurality of electronic host devices 410 (for example, including but not limited to a gaming console device, personal computer, mobile device such as a smartphone or tablet computing device, media device, or other electronic devices that may receive user interaction via a physically-separate controller or controllers) via a wireless communication protocol such as including (but not limited to) BLUETOOTH™, WiFi, NFC, ZIGBEE™, cellular radio frequencies (for example, either via an existing GSM or other cellular network, or by using cellular frequencies to create an ad-hoc or "mesh" network between devices as needed), or other suitable wireless communication protocols or technologies. According to the embodiment, two physically-separate controllers 400a-b may be paired to a host 410, for a user to hold one controller in each hand for ease of manipulation and ergonomic comfort. For example, a user may hold the controllers at a comfortable angle and distance while seated, enabling a greater level of comfort than would be possible with a single controller manipulated with both hands. For example, a user may grasp a controller in each hand during exercise or full-body interactive gameplay, such as while running on a treadmill or interacting with a virtual fitness trainer such as using a NINTENDO WII™ gaming console. It should also be appreciated that a control device 400a-b may optionally be paired with more than one host device 410, for example using a single controller to interact with multiple computers or mobile devices, for example for giving a presentation or directed instruction, where an instructor may interact directly with students' devices.

FIG. 4B is a diagram illustrating an exemplary physical arrangement of paired, nested-communication wireless control devices 400a-b, illustrating communication via an adapter 420 according to a preferred embodiment of the invention. According to the embodiment, a communication adapter 420 may be utilized to facilitate communication between a plurality of controllers 400a-b and a plurality of host devices 410, for example to connect multiple physical controllers and present them to a host as a single "virtual controller" (as may be required according to a particular software application being interacted with, for example a video game that requires a unitary controller design) or to bridge communication between host and controllers that may otherwise be incapable of communicating (for example, if one device relies solely on a BLUETOOTH™ radio for connectivity while other use WiFi, or if two different communication protocols are in use). Additionally, a communication adapter may be operated by a control device, for example in an arrangement where multiple additional or "secondary' controllers communicate with a designated "primary" controller, which in turn communicates with a host device, for example by receiving communication from each additional controller and presenting all communication to a host device in a "nested-communication" arrangement wherein the primary controller serves as a communication adapter between other controllers and a host (as described below, referring to FIGS. 5-6). For example, a primary controller may be operate a communication adapter 420 to bridge communication between fitness trackers or wearable devices (for example, such as FITBIT™, APPLE WATCH™, or MICROSOFT BAND™ devices) to a plurality of host devices 410, such as to integrate fitness or health information (as is commonly tracked by wearable devices) with video games or other software applications. Such an arrangement can also be used to bridge data between devices from different vendors or running different software or operating systems, for example to integrate health data from an APPLE WATCH™ device with a MICROSOFT XBOX™ gaming console, or fitness information from a FITBIT™ fitness tracker with a SONY PLAYSTATION™ gaming console, or other combinations of hardware, software, and vendors.

For example, according to a particular intended use such as for interaction with a home gaming console (for example, Microsoft XBOX™ or Sony PLAYSTATION™), a particular wireless protocol or hardware technology may be utilized, or a control device 400a-b may be configured with hardware means to utilize a number of communication protocols according to a particular use, while a user may be given an option to select a desired protocol or frequency for use. For example, a control device 400a-b configured for use with a desktop computer may be configured to utilize BLUETOOTH™ radio communication in the 2.4 GHz frequency range. A hardware switch or button 401b may optionally be provided whereby a user may select a different frequency as needed, for example a radio frequency in the 5 GHz range for use over a WiFi network instead of BLUETOOTH™, for example to increase range or speed or to avoid interference from other devices (for example, many microwave ovens used within a home or office may cause interference in the 2.4 GHz frequency band). The use of various wireless communication means may enable a user to hold a plurality of control devices 400a-b in any position or manner they choose, improving ergonomics and relieving discomfort or the risk of repetitive-stress injuries that may occur using traditional control devices that generally require a user to grasp them in a particular fashion (for example, a computer keyboard that generally requires a user's arms and hands to be in an awkward alignment).

By utilizing wireless connectivity according to the embodiment, increased movement or positioning of a plurality of control devices may be used as an additional interaction method for users, for example using gesture-based input methods or position-tracking via internal hardware sensors such as accelerometers or gyroscopes. In this manner, additional forms of input may be enabled at a user's preference, increasing the quality or quantity of interaction possible with a particular control device and optionally reducing the need for specific hardware buttons. For example, a gesture-enabled control device may be programmed with a particular motion gesture that simulates the pressing of a "volume up" button, eliminating the need for a hardware button to perform that function.

According to the embodiment, a plurality of hardware buttons may be provided on a control device 400a-b, and may vary in physical design or arrangement. For example, membrane or mechanical switch-based buttons may be utilized to provide a tactile sensation upon activation by a user (as is common in hardware keyboards intended for specific uses such as gaming or professional design), or capacitive touch-based buttons may be utilized to provide interaction in a more compact physical arrangement when tactile sensation may not be required (as is common in mobile applications, such as on-screen controls on a smartphone or tablet computing device).

Hardware buttons or other controls may be placed in various arrangements according to a particular use or desired functionality, for example a digital or analog "trigger"-style button 404 may be placed on the underside of a control device (shown in a side profile view) 400c, for example for use in gaming application where a trigger-actuated function may be desirable (such as in first-person, racing, or simulator games). Another exemplary arrangement may be a number of buttons 402a-n arranged in a particular fashion for use in navigation, such as to form a directional pad (D-pad) for use in a variety of games or applications, such as for navigating a media player interface or playing a video with a top-down view, such as a strategy or simulated board game. Other buttons may include large easily-reached buttons 401a for use in games or applications when a user may need to quickly select and actuate a button without looking. Such buttons may be provided with a variety of identifying features such as readable text labels, colors, or physical shapes for example including (but not limited to) a square 401a, circle 401b, triangle 403a or star-shaped 403b control buttons.

According to the embodiment, a particular exemplary arrangement may be a pair of controllers that in effect act as a single "split controller", wherein a user grasps each device in one hand and various functions are divided between the two devices to facilitate two-handed interaction without the need for using both hands on a unitary device. Controls may be arranged in a combined fashion, with directional buttons arranged about the top portion of each device, with a functional button positioned in the center of the directional buttons to provide an easily-reached button for interaction (for example, to "accept" or "click" on a menu item on-screen). Additionally, these combined control arrangements may then be coupled with a plurality of internal hardware sensors, such as accelerometers, gyroscopes, Hall effect sensors, or other hardware means of facilitating physical interaction through the capture and interpretation of sensor data, for example to enable interaction through the use of predefined or customizable gestures or position-tracking.

A variety of alternate or additional control device arrangements may be utilized in various combinations through a nested-communication protocol. For example, according to their planned use (such as for a particular game or application, or for use with a particular device or console) a user may select their preferred "primary" control device, and then pair a "secondary" control device with it. In this manner it may be appreciated that the specific number, style, or arrangement of buttons or other interactive features or physical design such as ergonomic shape or layout may vary widely, and a user may select the particular arrangements and combinations that appeal to them based on their particular needs or use. A variety of control device arrangements are described below, referring to FIG. 5, and it should be appreciate that any particular control device may be utilized as either a primary or secondary controller interchangeably, according to a user's preference. Additionally, through the use of various wireless communication technologies as described previously, additional hardware devices may be paired with a control device for nested communication. For example, fitness trackers (for example including, but not limited to, FITBIT™, MICROSOFT BAND™, or APPLE WATCH™ devices) may be paired via a wireless personal-area-network protocol such as BLUETOOTH™ or ANT™, for example to provide a user's biometric or health information along with interaction via a control device 400a-b.

FIG. 5 is a diagram illustrating a variety of exemplary physical configurations of nested-communication wireless controllers 500a-c, configured for various uses. According to one exemplary arrangement, a controller 500a may be configured for optimum use as a media playback remote control, for example for use with a connected speaker or playback device, or with a home theater or media PC setup. According to such an arrangement, a number of buttons 501a-n may be arranged for use in navigating an on-screen interface of a media device, for example to select audio or video content from a library for playback. A number of additional buttons 502a-n may be arranged in a secondary location, to provide additional functions such as play/pause, stop, or menu functions such as to view additional information on selected media. According to a particular use, such a control device 500a may be used as a primary controller, optionally with or without a secondary controller paired for nested communication, such as a user's fitness tracking device for use in monitoring heartbeat or other biometric changes during media viewing, or a gaming controller for use in playing interactive content presented through a media server or playback device (for example, playing a game on a ROKU™ or similar home theater device connected to a television).

According to another exemplary arrangement, a controller 500b may be configured for a particular gaming use, for example formed with an appropriate physical shape and having control elements (buttons, switch, and other interactive hardware elements) arranged to best suit a simulation-type game. According to such a configuration, a control device 500b may have a digital or analog "joystick"-type control element 510 for use in controlling a player's character or vehicle in a 360-degree three-dimensional virtual environment, for example for use in third-person action or adventure-type games. A plurality of additional buttons 511a-n may be provided and arranged for easy one-handed use, such as to access a player's inventory, perform specific in-game actions (for example to jump, run, roll, or other movement controls), or to perform context-sensitive actions according to the nature of a particular game or application. For example, a simulator-oriented control device 500b may be paired with a media remote control device 500a as a secondary controller, enabling a user to navigate a media interface with the media remote 500a as their primary control device, select a game from a media content menu, and then use the secondary control device 500b to play the game. When finished playing, the user may then continue using their primary controller 500a to further navigate the media interface, without the need to locate a remote control or switch controllers for different uses, as both controllers may be paired and in communication, even while one may be temporarily unused.

According to a further exemplary arrangement, a control device may be configured for use specifically as a secondary controller, for example as a throttle controller 500c configured to be paired with a simulator controller 500b for use in a two-handed "hands on throttle and stick" (HOTAS) setup commonly used in flight-simulation games. According to such a configuration, a control device 500c may comprise a joystick or hat-switch control element 520 for navigation or for controlling a number of game or application functions with a user's thumb, generally positioned such that while holding control device 500c a user's thumb is naturally aligned with the control element 520 for ease of use. Control device 500c may further comprise an integrally-formed or removably affixed ergonomic portion 521, for example a removable or positionable rigid or soft panel, generally configured to conform to a user's hand or palm and align the user's hand for proper manipulation of various control elements. For example, in one exemplary arrangement, a control device 500c may be configured with a body made of a rigid plastic material and having a removable plastic panel 521 shaped to fit a user's palm for a proper grip and alignment during use. Such a configuration may also be designed to accept a variety of alternate rigid panels 521, enabling a user to swap grip panels to configure the physical shape of control device 500c to most comfortably fit their particular anatomy (for example, such a configuration has been used in the firearms industry to enable users to configure the grip of a handgun for proper posture and aiming). Control device 500c may further comprise a plurality of additional control elements 522a-n such as buttons or switches, for example arranged such that when properly aligned (as by using an ergonomic grip panel, as described previously) a user's fingers may naturally be aligned in a position for ideal activation of control elements 522a-n. In this manner, it may be appreciated that a control device 500a-c may be configured with ergonomic portions 521 in a variety of arrangements, and with various arrangements of control elements for optimal use when a user's hand is properly aligned and grasping control device 500a-c, such that any particular control device 500a-c may be tailored to fit a wide range of users' anatomies for optimal use, as well as to promote ergonomic comfort and physical health. For example, by encouraging users to find an optimum ergonomic fit, the risk of repetitive-stress injuries and other health concerns may be reduced.

FIG. 6 is a flow diagram illustrating an exemplary method 600 for nested communication between control devices and electronic systems, according to a preferred embodiment of the invention. In an initial step 601, a control device may be paired with an electronic system (for example, such as a personal computer, gaming console, or home theater or media center) as a primary control device, for example either as an automatic process (such as when an electronic system or controller is first powered on) or manually (such as by direct user action to initiate pairing). In an optional next step 602, a plurality of additional control devices may be paired with the primary control device, for example for a user to use a control device in each hand, or for multiple users to each pair one or more control devices for their own use in a group arrangement (for example, for multiple users playing a video game together). In a next step 603, the primary control device may send a plurality of user interaction to a paired electronic system, for example when a user presses a button or makes a selection. In an optional next step 604, any of the plurality of additional control devices may send a plurality of user input to the primary device, and the primary control device may then send the user input to a paired electronic system. In a next step 605, a paired electronic system may send a plurality of feedback to the primary control device, such as instructions for haptic feedback (for example, to activate a vibration motor) or information for presentation on a visual display operated by a control device. In an optional final step 606, the primary control device may transmit a plurality of feedback to an additional control device, for example if feedback was sent from an electronic system intended for a connected additional control device. In this manner, it can be appreciated that all communication between control devices and electronic systems passes through and is facilitated by the primary control device.

Figure 8:
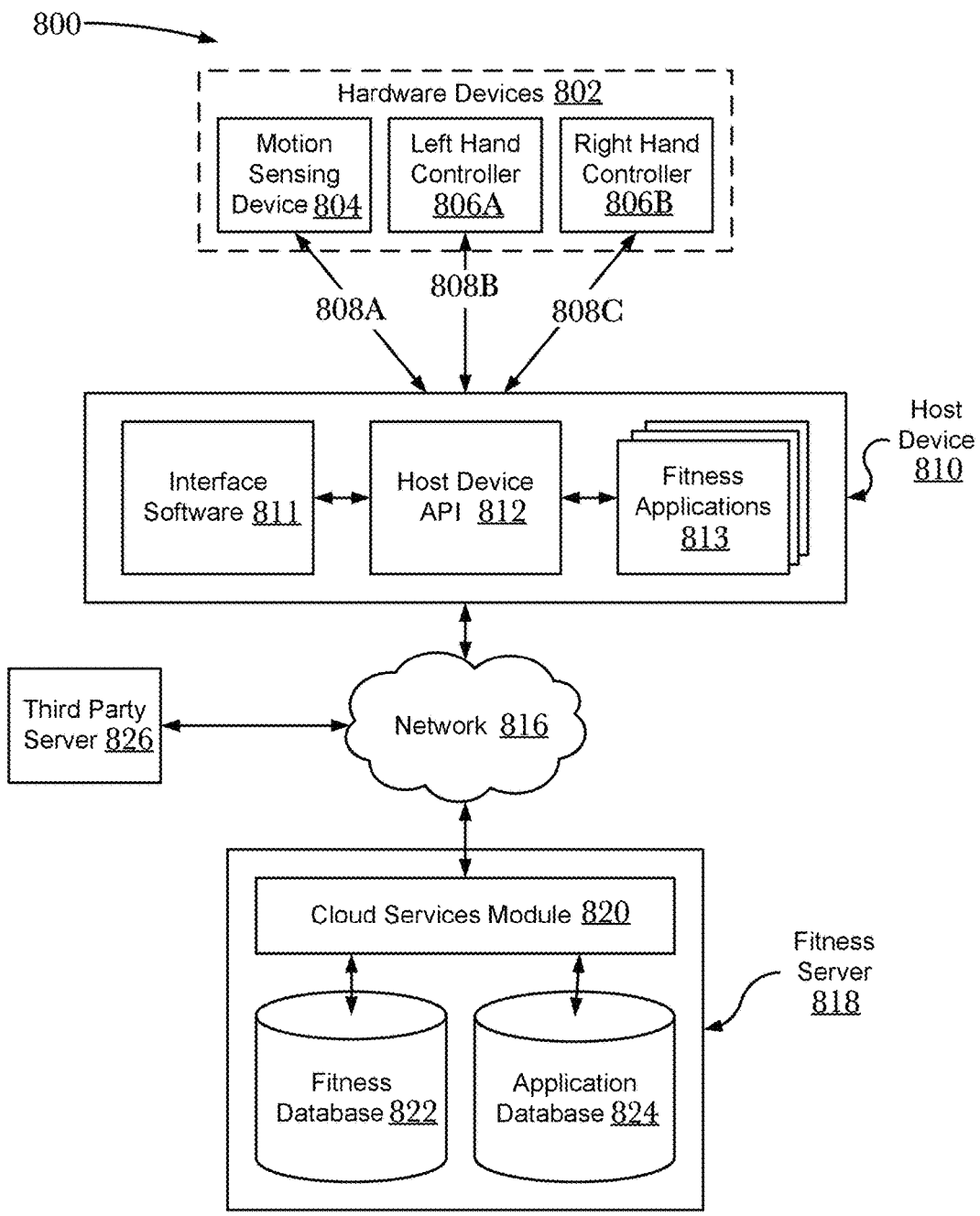
FIG. 8 is a block diagram illustrating components of an adaptable fitness system, according to an embodiment of the invention.

FIG. 8 is a block diagram illustrating components of the adaptable fitness system 800, according to one embodiment. The adaptable fitness system 800 includes hardware devices 802, a host device 810, and a fitness server 818.

The hardware devices 802 include a motion sensing device 804, a left hand controller 806A, and a right hand controller 806B. The motion sensing device 804 is mounted on a user's body and detects the user's physical motions, which allows the users to interact with a fitness application 813 operating on the host device 810 by performing motions. An example motion sensing device 804 is described in detail with reference to FIGS. 9A and 9B. The hand controllers 806A, 806B include buttons that the user can press to interact with a fitness application 813. For easy access, one or both of the hand controllers 806A, 806B may be mounted on the handles of a piece of exercise equipment. An example hand controller 806 and mounting system is described with reference to FIGS. 9C and 9D, respectively.

In alternative embodiments, additional hardware devices 802 may be used. For example, the hardware devices 802 may also include athletic shoes with embedded sensors or motion sensors that attach directly to a fitness device. In addition, some of the hardware devices shown 802 shown in FIG. 8 may be omitted. For example, only one of the hand controllers may be used, or the two hand controllers 806A, 806B may be replaced with a combined hand controller that contains the all of the buttons that would normally be distributed between the two hand controllers 806A, 806B.

As a whole, the hardware devices 802 can be used to adapt a fitness device (e.g., a step machine, an elliptical machine, a treadmill, a rowing machine, etc.) into a game controller that receives a user's physical input (both motions and button presses) and generates corresponding input data for interacting with a fitness application 813. For example, the input data could be used to control a virtual character or object in the fitness application.

In some embodiments, multiple sets of hardware devices 802 may be added to the system 800 to adapt additional fitness devices into additional game controllers. For example, multiple stationary bicycles may be adapted into controllers for a bicycle racing application, thus allowing multiple users to participate in virtual races against each other.

Input data from the hardware devices 802 are sent over communication links 808A, 808B, 808C (hereinafter referred to collectively as 808) to the host device API 812 on the host device 810. The communication links 808 may be wired or wireless connections. In one embodiment, the communications links 808 are based on the Bluetooth Low Energy (BLE) protocol, and the hardware devices 802 are BLE devices. If additional sets of hardware devices 802 are included in the system, additional communication links 808 are established to connect the hardware devices 802 to the host device 810.

In the illustrated embodiment, the communication links 808 connect each hardware device 802 directly to the host device 810. In this embodiment, the three hardware devices 802 connect simultaneously to the host device 810 over the communication links 808A, 808B, 808C.

The hardware devices 802 may all connect over the same communication protocol (e.g., Bluetooth Low Energy), or over different communication protocols.

In another embodiment, only the motion sensing device 804 is connected directly to the host device 810 via the first communication link 808A. In this embodiment, the two hand controllers 806A, 806B are coupled to the motion sensing device 804 via the other two communication links 808B, 808C, and the motion sensing device 804 is configured to relay input data from the hand controllers 806A, 806B to the host device 810. This embodiment is described in more detail with reference to FIG. 9A.

The host device 810 includes interface software 811, a host device API 812, and one or more fitness applications 813. As a whole, the host device 810 is a computing device that is capable of executing program instructions. The host device 810 may be, for example, a smartphone, tablet computer, laptop computer, or desktop computer.

The interface software 811 and the host device API 812 operates in conjunction with the interface software to act as an interface between the hardware devices 802, the fitness applications 813, and the fitness server 818. When no hardware devices 802 are connected, the host device API 812 initiates a scan for hardware devices 802 at fixed intervals. Button presses on the hand controllers 806A, 806B or motion on the motion sensing device 804 will trigger the respective device to broadcast for connection (if not already connected). If the device's broadcast overlaps with one of the host device API's scanning intervals, then the host device API 812 initiates a connection attempt to the respective device. This process of establishing a connection after detecting a button press or motion allows for intuitive connection of hardware devices 802 to the host device 810. The host device API 812 maintains the connection between a fitness application 813 and a hardware device 802 as long as the application 813 remains active. After establishing a connection with one or more hardware devices 802, the interface software 811 and host device API 812 receive and process input data from the hardware devices 802 so that the input data can be used to control an application 813. For example, the input data can be used by the application 813 to control a virtual character or object in a game.

The host device API 812 can distinguish the input data from the different hardware devices because the firmware of each hardware device can be configured to include an identifier (e.g., a binary value) in a header of any input data that is sent to the host device 810. Thus, the motion sensing device 806 would have a different identifier than the hand controllers 806A, 806B. The interface software 811 can then build a software state representation of each device based on the device's identifier, and the host device API 812 can map input data to its respective software state representation to identify the originating hardware device. After the input data is mapped, e.g., via a table or index, to the corresponding hardware device, the data can be used to as inputs to fitness applications 813. In embodiments where the motion sensing device 804 is configured to relay input data from the hand controllers 806A, 806B to the host device 810, the motion sensing device 804 may be configured to read the identifier in the input streams from the two hand controllers 806A, 806B and relay a single integrated input stream to the host device 810. This process is described in more detail with reference to FIGS. 9A and 9D.

In some embodiments, the left and right hand controllers 806A, 806B are manufactured to be identical (e.g., to reduce manufacturing costs) and have the same identifier. In these embodiments, it may be difficult to automatically distinguish between the input data from the two hand controllers 806A, 806B, so the interface software 811 may prompt the user to manually identify the two hand controllers (e.g., by first pressing a button on the left hand controller 806A and then pressing a button on the right hand controller 806B.) This setting can then be stored by the interface software 811 as part of the device's software state representation.

The interface software 811 can use a similar process to distinguish input data from different hardware devices when multiple sets of hardware devices are connected to the host device 810 (e.g., for a multiplayer game). For example, the interface software 811 may display a prompt to move a first motion sensing device 804 (e.g., attached to a stationary bicycle), then display a prompt to move a second motion sensing device 804 (e.g., attached to an elliptical trainer), and then display similar prompts to identify the respective hand controllers 806 on the two fitness devices.

In one embodiment, signals from the hand controllers 806A, 806B and motion sensing device 804 are wirelessly sent to the host device 810 as input data using a custom Bluetooth GATT profile. The data sent from the hardware devices 802 are then processed by the host device API 812.

An example of the dataflow between the hardware devices 802 and the host device 810 is presented below:
1. The motion sensing device 804 acts as a server and the host device 810 connects as a client.
2. The host device 810 (the client) subscribes to data notifications of a specific service feature of the motion sensing device 804, such as an accelerometer.
3. A reading from the service feature (e.g., an accelerometer reading) is taken from motion sensing device 804.
4. The reading is sent to the host device 810 (the client subscriber). For example, the three-axis accelerometer reading may be sent as three bytes.
5. The interface software 811 decodes the reading and makes the readings available to applications 813 via the API 812. The readings are interpreted as input data by the application 813 and allow users to make selections or to control/manipulate elements (e.g., objects, characters, etc.) within the application 813 or to react to game cues or other interactive elements within the application 813.

The fitness applications 813 are applications that receive input data from the hardware devices 802 through the host device API 812 and carry out some sort of user interaction based on the input data. For example, the fitness applications 813 can be exercise games or any non-game application that can interact with a fitness device in a meaningful way (e.g., an application 813 interact with hardware devices 802 mounted on a treadmill to simulate a walk through a park).

Applications 813 (including games) may be configured to encourage the user to exercise. As the user exercises, data received from the hardware devices 802 is recorded on the host device 810 to reflect progress in the user's experience. Applications 813 can also connect to a fitness server 818 through the network 816, where user data and statistics can be stored and accessed.

One example of how the hardware devices 802 can interact with the software on the host device 810 could be a user attaching the motion sensing device 804 to the pedal of a stationary bicycle. An accelerometer in the motion sensing device 804 measures the motion of the pedals, allowing for realistic control of a 'virtual biking' application 813. Another example of how hardware devices 802 interact with software could be a user attaching the motion sensing device 804 to their hip, with the motion sensing device 804 detecting that motion for a dance or exercise game.

The host device API 812 may be configured to run on any suitable operating system, such as iOS, Windows/Mac/Linux or Android. Different versions of the host device API 812 may be created for different operating systems. Although shown as a separate entity within the host device 810, the host device API 812 is typically a separate code library that is compiled into a fitness application 813 at build time. This allows a third-party developer can write a fitness application 813 that uses functions in the host device API 812 to exchange data with the hardware devices 802 and the fitness server 818.

The fitness server 818 includes a cloud services module 820, a fitness database 822, and an application database 824. The fitness server 818 and its components 820, 822, 824 may be embodied as a single device or as a cluster of networked devices (e.g., a cluster of web servers).

The cloud services module 820 receives historical data, such as physical activity and game performance data, from the host device API 812 and stores the data in the appropriate database 822, 824.

The cloud services module 820 also allows users to access their information on any device and at any time. The module also processes user requests to compare and share scores on third-party servers 826, such as social networking systems, e.g., FACEBOOK and TWITTER.

The cloud services module 820 can also host multiplayer games. In one embodiment, games are hosted in asynchronous context. After a user set ups a challenge, the cloud services module 820 can give a user a window in time to finish his "turn" or just wait until he completes a given goal. This information is stored in the application database 824. The cloud services module 820 executes the logic of the games, challenges, or goals that are created between players and maintains their states and progression.

In an alternative embodiment, the cloud services module 820 also hosts multiplayer games in real-time, with real-time game data moving back and forth between players on different host devices 810.

The databases 822, 824 may be stored across a cluster of several servers for scalability and fault-tolerance.

The cloud services module 820 also performs functions associated with the processing of movement units. Movement units are a standard unit of measurement across different types of fitness devices. These movement units are defined by a standard movement signature from the motion sensing device. In one embodiment, the movement units are normalized to provide consistency between differing types and makers of fitness equipment. A normalization table can provide a cross reference between devices for later retrieval and analysis for comparison on a standardized basis. In one embodiment, a standard movement signature is achieved when an accelerometer on the motion sensing device 804 crosses a particular g-force threshold. For example, a standard movement signature may be defined as a deviation of 1 G from a moving average of 20 accelerometer samples collected over 333 ms. In general, movement units may be defined based on any number of parameters, including calorie burn or heart rate. Additional software functionality may be added to the host device API 812 or the fitness applications 813 to improve the accuracy of movement units. For example, if calorie burn is the main parameter, then an option to select the type of fitness machine being used may be added).

A user can create a personal goal to achieve a set number of movement units in a given time period. For example, a goal can be 50,000 movement units in one week. These personal goals can then be shared with friends within a social network.

Users can create also cooperative goals for a group in a social network to achieve a set amount of movement units. For example, a group of five people may set a goal to achieve 250*k* movement units for the week.

Movement units can also be used as a basis for activities that benefit from normalization of data for comparison purposes. For example, movement units can be used in competitions between groups or friends in a network. Challenges can be issued and broadcast to a user's friends on social network.

Figure 9A:
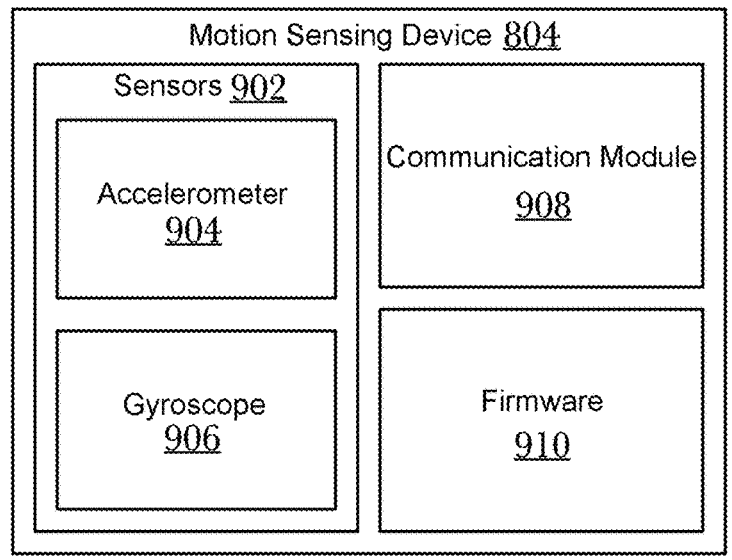
FIG. 9A is a block diagram illustrating the components of a motion sensing device according to an embodiment of the invention.

In one embodiment, the cloud services module 820 retrieves a user's social graph from a social networking system on a third-party server 826 and reproduces the social graph on the fitness server 818. Thus, subsequent functions associated with social game mechanics (e.g., the creation of challenges and cooperative goals) can be executed on the fitness server 818. FIG. 9A is a block diagram illustrating the components of the motion sensing device 804, according to one embodiment. The motion sensing device 804 includes sensors 902, a communication module 908, and firmware 910.

The sensors 902 detect the user's physical motions. In the illustrated embodiment, the sensors 902 include an accelerometer 904 and a gyroscope 906. However additional or different sensors 902 may be included in the motion sensing device 804.

The communication module 908 interacts with the communication link 808A to transfer data between the motion sensing device 804 and the host device 810. For example, the communication module 908 may receive input data from the sensors 902 and send the input data to the host device 810 to be used by a fitness application 813. In one embodiment, the communication module 908 connects via the Bluetooth Low Energy (BLE) protocol. The firmware 910 contains logic that manages the operation of the motion sensing device 804. For example, the firmware 910 may contain logic to support a "shake to connect" function that monitors the sensors 902 and establishes the communication link 808A to the host device 810 upon detecting that a user has shaken the motion sensing device 804.

In an alternative embodiment described with reference to FIG. 8, the two hand controllers 806A, 806B are coupled to the motion sensing device 804 and the motion sensing device 804 is configured to relay input data from the hand controllers 806A, 806B to the host device 810. In this alternative embodiment, the firmware 910 is configured to detect and connect to the hand controllers 806A, 806B independently of the host device 810, and the communication module 908 maintains the connections with the hand controllers 806A, 806B after they are established. The connections with the hand controllers 806A, 806B may be under the same communication protocol as the communication link 808A (e.g., Bluetooth Low Energy) or a different communication protocol (e.g., an RF connection). Meanwhile, the firmware 910 manages the three connections (the connections with the two hand controllers 806A, 806B and the communication link 808A with the host device 810) and relays input data from the hand controllers 806A, 806B to the host device 810. In some embodiments, the firmware 910 may be configured to combine the input data from the sensors 902 and the hand controllers 806A, 806B into a single integrated input stream. Thus, the host device API 812 receives a single input stream that includes inputs from all three hardware devices.

Figure 9B:
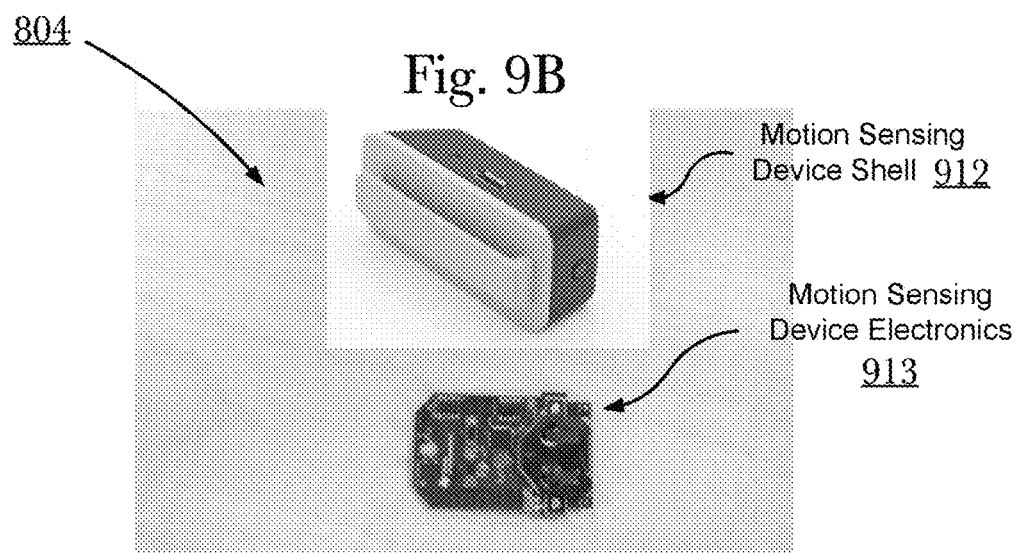
FIG. 9B illustrates a motion sensing device, according to an embodiment of the invention.

FIG. 9B illustrates a motion sensing device 804, comprising an outer enclosure or shell 912 and internal electronic components 913, according to one embodiment. As described above with reference to FIG. 8, the motion sensing device 804 attaches to the user (e.g., around the leg) and uses sensor 902 to measure the user's movements, which are recorded as input data and sent to the host device 810. As shown in FIG. 9B, the motion sensing device 804 is housed in a small enclosure 912 so that it can be attached to the user in multiple ways. In the illustrated embodiment, the motion sensing device 804 connects wirelessly to the host device 810 and is powered by a battery.

Figure 9C:
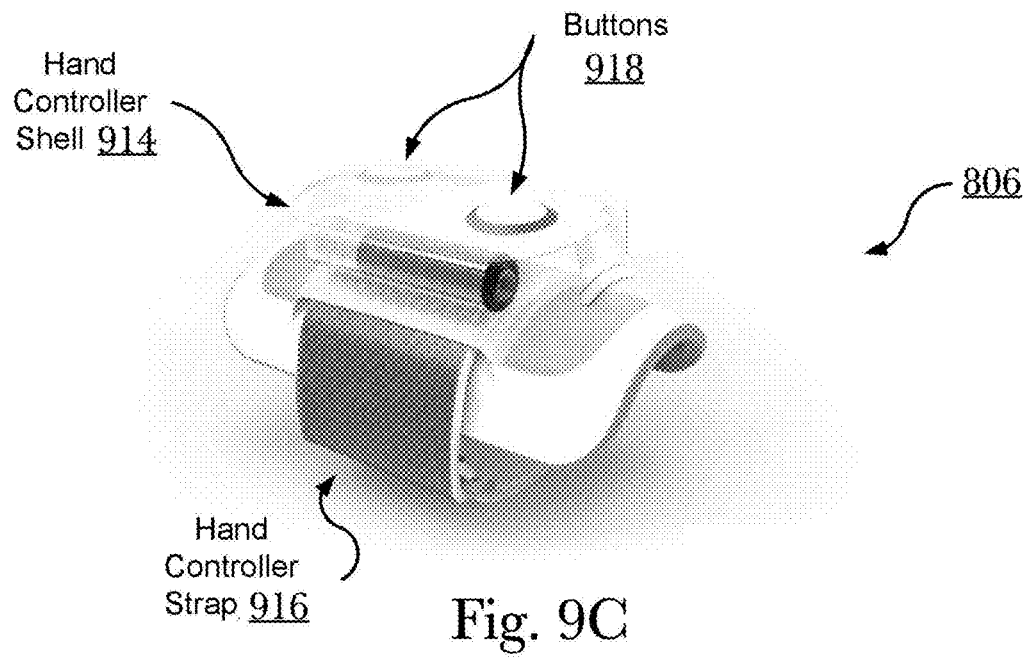
FIG. 9C illustrates a hand controller, according to an embodiment of the invention.

FIG. 9C illustrates a hand controller 806, according to one embodiment. The hand controller 806 includes a handle 914 and a strap 916. One or more buttons 918 are mounted on the handle 914. The handle 914 may also include a directional pad or joystick either in addition to or in place of the buttons 918. As described above with reference to FIG. 8, the hand controller 806 communicates with the host device 810. In the illustrated embodiment, the hand controller 806 communicates wirelessly and is battery powered.

Internally, the hand controller 806 includes a radio and a microcontroller. In one embodiment, the radio is an RF radio that connects to the motion sensing device 804 and sends an input signal to the motion sensing device 804 to be relayed to the host device 810. In an alternative embodiment, the hand controller includes a Bluetooth Low Energy (BLE) radio and a system on a chip (SoC). In some embodiments, the radio, microcontroller, and any other electronic components of the hand controller 806 may be placed on a single printed circuit board.

Figure 9D:
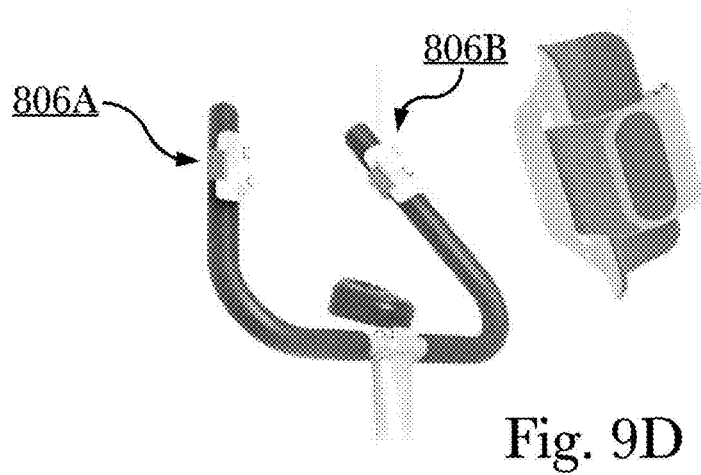
FIG. 9D illustrates an example of hand controllers mounted to handlebars of a fitness device, according to an embodiment of the invention.

FIG. 9D illustrates an example of hand controllers 806A, 806B mounted to handlebars of a fitness device, according to one embodiment. The straps 916 of the hand controllers 806A, 806B are wrapped around the handlebars. In one embodiment, the bottom side of the handle 914 may include an adhesive substance to increase the friction between the hand controllers 806A, 806B and the handlebars.

To reduce manufacturing costs, some or all of the components of the two hand controllers 806A, 806B may be identical. In one embodiment, the two hand controllers 806A, 806B are completely identical (e.g., same mechanical enclosure, internal electronics, and firmware). In this embodiment, it may be difficult for the firmware 910 or the host device API 812 to distinguish between the two hand controllers, and the interface software 811 may prompt the user to identify each hand controller as described above with reference to FIG. 8. In another embodiment, the two hand controllers have the same internal electronics (e.g., the same microcontroller, radio, etc), but may be placed in different enclosures to identify one controller as the left hand controller 806A and the other as the right hand controller 806B. For example, the buttons 918 on the two hand controllers may have a different layout or different colors, or the housings may have symmetric ergonomic features so that they are better suited for a user's hands. The two hand controllers 806 may also be flashed with different firmware so that the motion sensing device 804 or host device API 812 can distinguish between the input data from the two controllers 806. For example, the firmware on the left hand controller 806A may be configured to send an identifier (e.g., a binary 0) in a header of its input stream, while the firmware on the second hand controller 806B may be configured to send a different identifier (e.g., a binary 1) in a header of its input stream.

Figure 10:
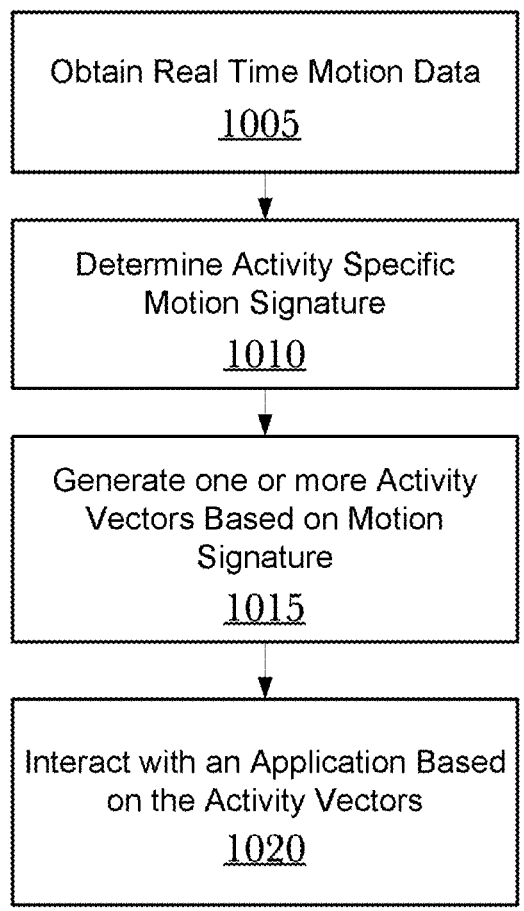
FIG. 10 is a flowchart illustrating an exemplary process for interacting with a fitness application based on a user's interaction with a fitness system, according to an embodiment of the invention.

FIG. 10 is a flow chart illustrating an exemplary process for interacting with a fitness application 813 based on a user's interaction with a fitness system, according to an embodiment of the invention. A user begins by attaching hardware devices 802 to a fitness device or the user's body; hand controllers 806A, 806B or motion sensing device 804 may either be held in the user's hands or attached to a fitness device, depending on a particular fitness application 813.

According to the embodiment, motion sensing device 804 obtains 1005 real-time motion data comprising acceleration data from accelerometer 904 or rotation data from gyroscope 906, as the user interacts with a fitness system. A fitness system is not limited to a stationary exercise machine such as a treadmill, but may also include dynamic means of exercise, such as running on a road. Data obtained by motion sensing device 804 may be transmitted to a host device 810 over established communication links 808.

Based on data obtained 1005, interface software 811 on a host device 810 may determine 1010 an activity-specific motion signature. The activity-specific motion signature may identify the current activity performed by a user. According to the embodiment, the motion signature may act as a basis against which future movements may be compared by a fitness application 813.

According to the embodiment, the interface software 811 may generate one or more activity vectors 1015 based on a motion signature. Activity vectors represent metrics associate with the activity level of the user. For example, the activity vectors may represent the number of calories burned by a user, the distance covered over a specific time interval, or the intensity level of the user. The activity vectors are a standard unit of measurement across different types of fitness devices.

According to the embodiment, the user interacts 1020 with a fitness application 813 based on the activity vector generated 1015 by interface software 811. By altering the intensity with which a user performs a fitness activity, the user changes the activity vector over a period of time. The change in the activity vector alters the state or behavior of an object in the fitness application 813, thereby allowing the user to interact with fitness application 813 on a host device 810. For example, if the user is playing a running video game, where the user's character is running on the screen through an obstacle course, the intensity at which the user runs on the treadmill or cycles on a bicycle influences the speed at which the user's character (the object in application 813) run across the screen (behavior exhibited by the object) in the game. Thus by running faster, the user changes the activity vector in real-time, corresponding to an increase in speed of the user's character. The user may also interact with the application based on input from the hand controllers 806. For example, the user could press a button on the hand controller 806 as the user's character approaches an obstacle in the video game, causing the user's character to jump over or avoid the obstacle.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 11:
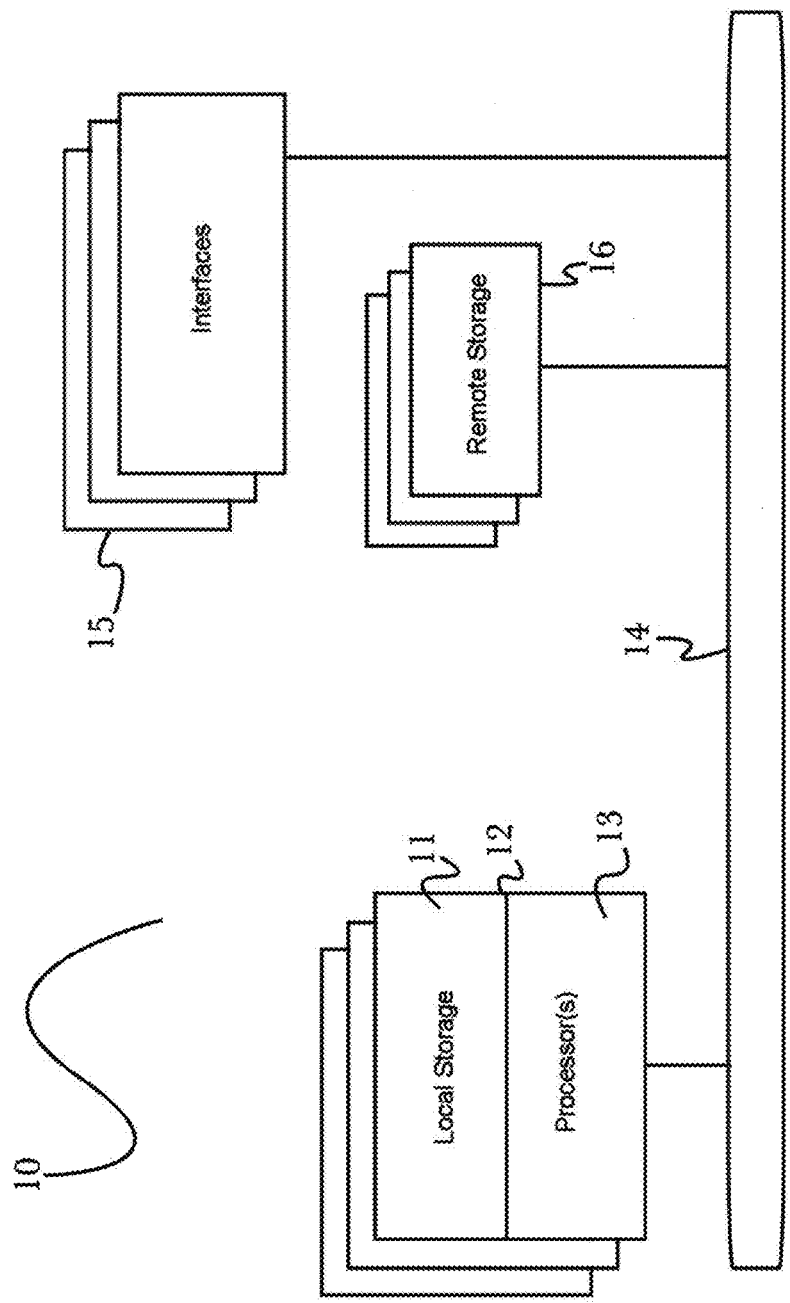
FIG. 11 is a block diagram illustrating an exemplary hardware architecture of a computing device used in an embodiment of the invention.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
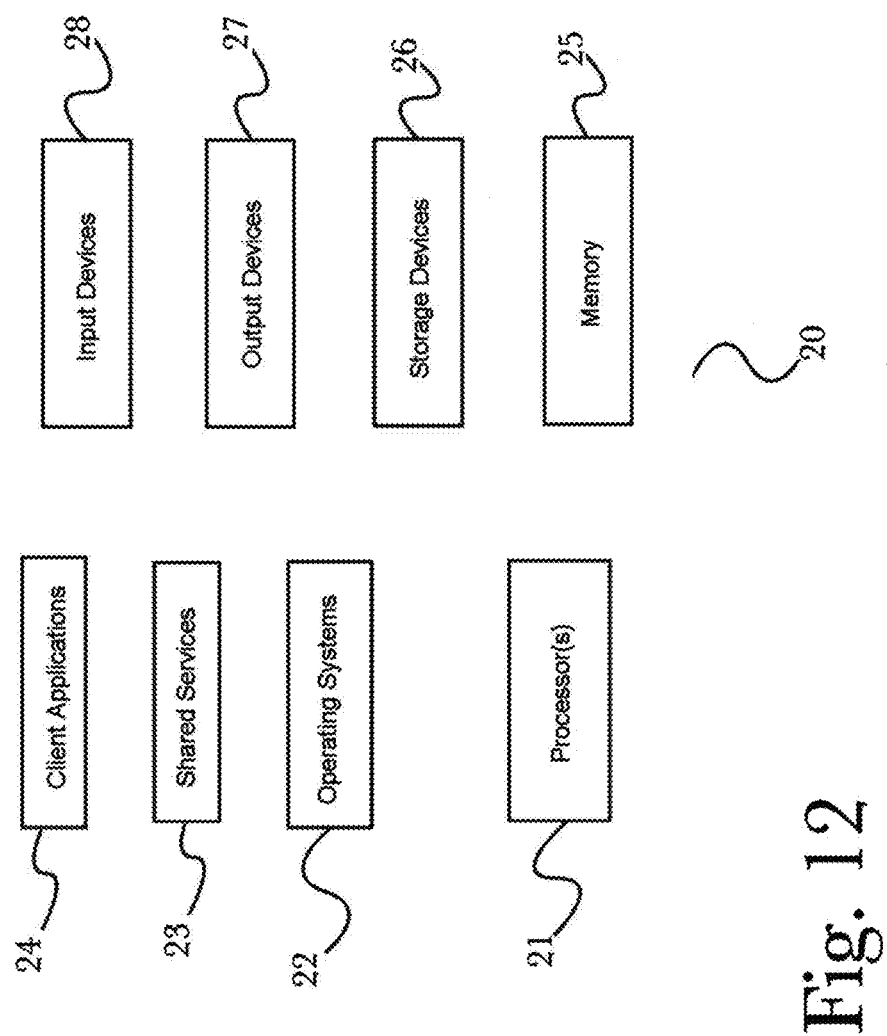
FIG. 12 is a block diagram illustrating an exemplary logical architecture for a client device, according to an embodiment of the invention.

In some embodiments, systems according to the present invention may be implemented on a standalone computing system. Referring now to FIG. 12, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, household gaming devices such as Microsoft XBOX™, Sony PLAYSTATION™, or virtual reality hardware devices such as Oculus RIFT™, HTC VIVE™, Samsung GEAR VR™, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
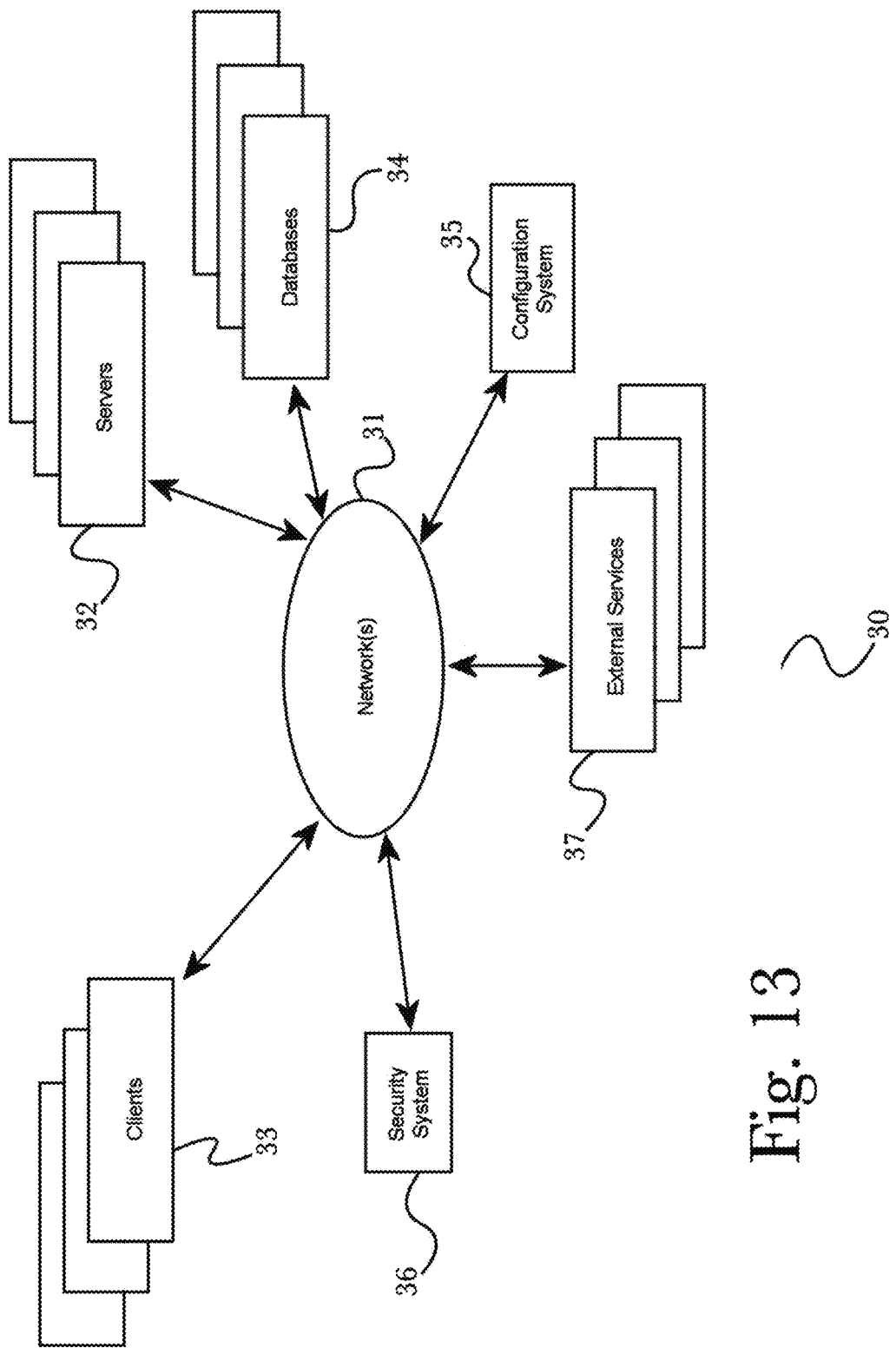
FIG. 13 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 13, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 14:
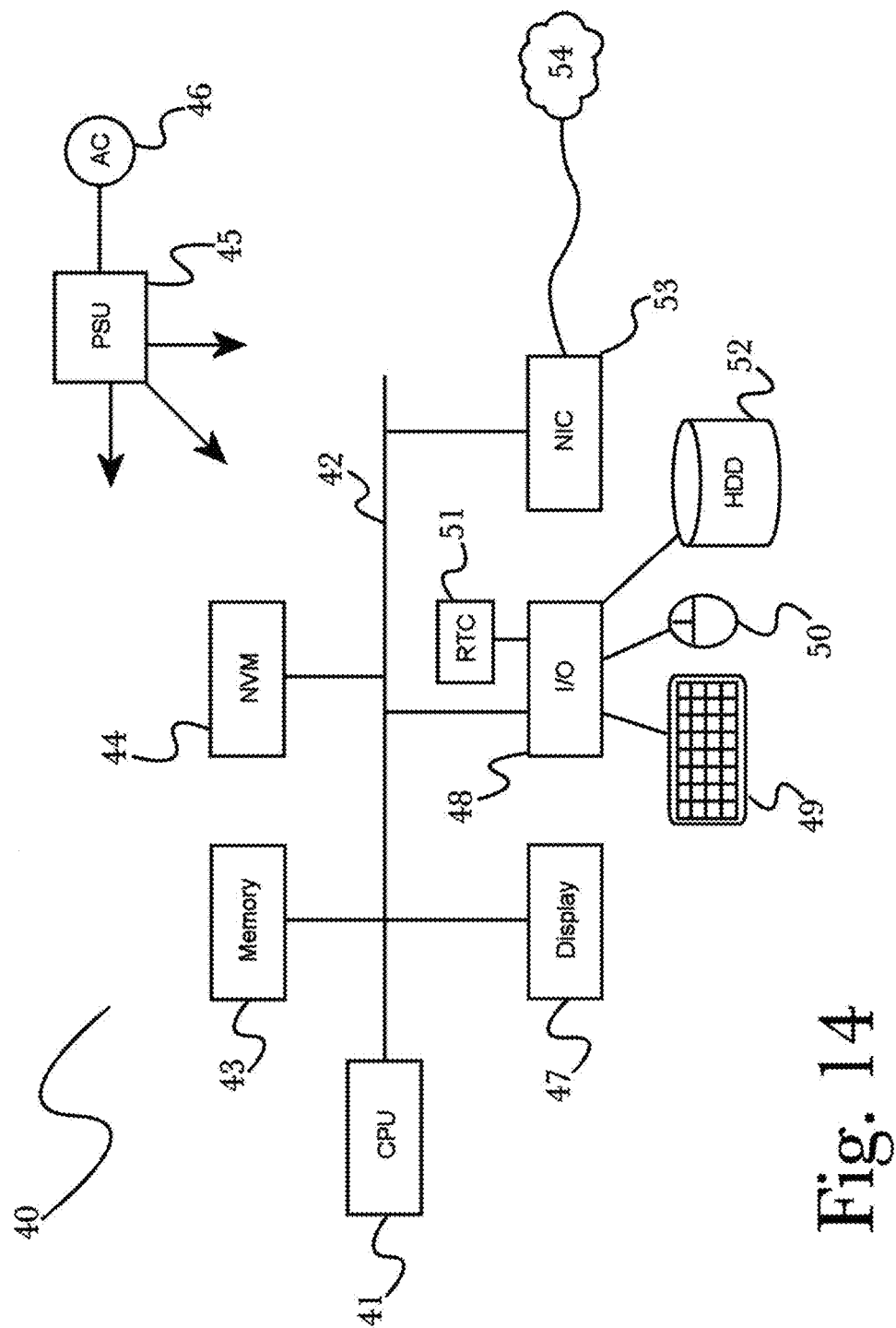
FIG. 14 is another block diagram illustrating an exemplary hardware architecture of a computing device used in various embodiments of the invention.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for using multiple electronic control and tracking devices for real-time mixed-reality interaction, comprising:

first electronic control device comprising at least a first memory, a first processor, and a first plurality of programming instructions stored in the first memory and operating on the first processor, the first programming instructions configured to:

communicate with a plurality of electronic devices each via one of a plurality of network communication protocols, the network communication protocol for each electronic device being selected from a plurality of protocols according to detected capabilities of the particular electronic device, wherein at least one of the plurality of electronic devices is a second electronic control device and further wherein at least one of the plurality of electronic devices is an electronic system comprising a computing device operating a mixed-reality software application;

transmit network communication in a two-way manner between the electronic system and at least the second electronic control device, each via the respective network communication protocol;

operate a plurality of hardware control elements, the hardware control elements configured to receive real-time manual interaction from a user;

transmit a plurality of interaction data to at least one of the plurality of electronic devices in real-time, the interaction data being based at least in part on at least a portion of the real-time manual interaction from the user;

receive real-time data from at least one of the plurality of electronic devices, wherein the real-time data comprises at least a plurality of real-time sensor readings; and execute an action within the mixed-reality software application based on the received real-time data.

2. The system of claim 1, wherein the plurality of electronic devices comprises at least a virtual reality device.

3. The system of claim 2, wherein the plurality of electronic devices comprises at least a fitness device.

4. The system of claim 3, wherein the fitness device comprises at least a fitness tracking device.

5. The system of claim 4, wherein the fitness tracking device provides at least a plurality of fitness information to at least the virtual reality device.

6. The system of claim 1, wherein the plurality of electronic devices comprises at least a plurality of tethers each comprising a line with one end being attached to an attachment point at a fixed location distal from the body of a human user and with the other end being attached to an attachment point proximal to the body of the human user, the proximal attachment point being configured to be worn or otherwise attached to a user's person or clothing, and at least a portion of the distal attachment points comprising a sensor configured to measure at least strain of an attached tether.

* * * * *